United States Patent [19]

Murakoshi et al.

[11] 4,271,415
[45] Jun. 2, 1981

[54] LASER COM DEVICE

[75] Inventors: Makoto Murakoshi; Shigenori Oosaka, both of Asaka, Japan

[73] Assignee: Fuji Photo Film Co., Ltd., Minami-ashigara, Japan

[21] Appl. No.: 88,422

[22] Filed: Oct. 25, 1979

[30] Foreign Application Priority Data

Nov. 7, 1978 [JP] Japan ................................ 53-136965

[51] Int. Cl.$^3$ ............................................. G01D 9/42
[52] U.S. Cl. .................................................... 346/108
[58] Field of Search ......................................... 346/108

[56] References Cited
U.S. PATENT DOCUMENTS 4,139,258  2/1979  Oharek ............................ 346/108 X Primary Examiner—George H. Miller, Jr.
Attorney, Agent, or Firm—Sughrue, Rothwell, Mion, Zinn and Macpeak

[57] ABSTRACT

A laser COM device in which a platen securing a film strip to a base plot may be moved between two mutually perpendicular positions to orient the delivery direction of the film strip parallel to either a main or auxiliary scanning direction. The platen is mounted over an aperture in the base plate at the other side of which is disposed a laser scanner. In one embodiment the aperture is round, and a cylindrical sleeve extends from the platen into the aperture. A slot in the base plate and a mating protrusion extending from the platen prevent rotation. In another embodiment, the aperture is square with a mating square sleeve extending from the platen.

5 Claims, 6 Drawing Figures

LASER COM DEVICE

BACKGROUND OF THE INVENTION

The present invention relates to a laser COM (Computer Output Microfilm) device capable of recording information on a strip of recording film in either a cine mode or a comic mode. A COM device in which an output signal of a computer is directly recorded on a recording film as a micropicture image has hitherto been used as a microfilm photographing device. In such COM devices, in a first known construction an output signal from the computer is displayed on a cathode-ray tube and the displayed picture image is focussed onto a recording film through an optical system while in a second known construction a micro-picture image is directly recorded on a recording film by scanning the recording film with a minute diameter laser flux which is modulated in accordance with the computer output signal. The latter type device is generally termed a laser COM device. In such a device either photosensitive or thermosensitive recording film can be used. In a type of a thermosensitive recording film in which a recording layer is melted or vaporized due to heat generated by the laser beam and converted to a transparent material, it is possible to observe the recorded condition simultaneously with the recording operation as a so-called instant or real-time recording output without a separate developing process. Accordingly, with such a fim type, the COM device functions at a high efficiency as a high speed output device.

Microfilm may have various configurations. For example, in a typical fiche-type microfilm, picture images are recorded on a recording film and frames are distributed in a two-dimension arrangement. Also a roll film in the form of film strips is known in which frames are arranged one-by-one along its longitudinal direction. The fiche film is formed into individual units by cutting a long recording film at a predetermined interval after the picture images are recorded thereon. In any case, the recording film for the recording process is initially a long film in the form of a strip. However, for either a fiche film or a roll film, the long recording film strips are, as shown in FIGS. 1A and 1B, classified into a cine mode and a comic mode according to the direction of the recorded images with respect to the longitudinal direction of the strip. That is, in the cine mode, as shown in FIG. 1A, the longitudinal directions of the picture image and the film strip are coincident with each other while in the comic mode, as shown in FIG. 1B, the longitudinal direction of the picture images and a widthwise direction of the long film are coincident with each other. In the aforedescribed cathode-ray tube type COM device, when the image is recorded on the microfilm in either a cine mode or a comic mode, the mode variation can be readily carried out by reversing the input XY deflection signals which control the deflection of the beam of the cathode-ray tube. However, in a laser COM device, it is very difficult to changeover the scanning direction, that is to redirect the laser beam at a right angle. Namely, since different deflecting elements are used for primary scan lines (X-deflection) and auxiliary scan lines (Y-deflection), it is impossible to interchange the primary and auxiliary scan lines with each other. On the other hand, in the case where the laser optical system is maintained as it is, and to effect the interchange the camera system, including a base plate, platen, a microfilm delivering mechanism and a control mechanism therefor, as a whole is turned by 90°, the mechanism which would be required for performing such a operation is too large in size and complicated in construction since the dimensions and the weight of the camera system are rather large. Further, where a monitor device capable of observing the recorded state is provided in the camera system such as for instance that described in Japanese Patent Application No. 52-31353, a much more complicated mechanism is required. In another case where an optical member such as an image rotator is inserted in the laser optical system, such optical system must have a large viewing angle and various space limitations must be imposed between the lens and the microfilm. Accordingly, such a method is unsuitable as a practical matter.

SUMMARY OF THE INVENTION

An object of the present invention is to provide a laser COM device capable of recording information in either a cine mode or a comic mode using a longitudinal recording film.

Another object of the present invention is to provide such a laser COM device capable of recording an image displayed in a monitor device operated in either a cine mode or a comic mode.

These and other objects of the present invention are achieved by providing a laser COM device including a platen supporting a strip-shaped recording film and fastened on a base plate, a delivering mechanism for delivering the recording film to the platen and a laser-optical system capable of recording micro-picture images by scanning the recording film with a modulated laser light in two-dimensions. In accordance with the invention the platen is fastened on a base plate so that, alternatively, a delivery direction (longitudinal direction) of the recording film and a direction of a main scan of the laser optical system substantially coincide with each other or the delivery direction and a direction of a sub-scan of the laser optical system also substantially coincide with each other.

BRIEF DESCRIPTION OF THE INVENTION

DESCRIPTION OF THE PREFERRED EMBODIMENTS

A laser optical system such as may be used in the present invention is well-known but will nonetheless be briefly discussed. In the laser COM device, the laser beam emitted from the laser light source is modulated in accordance with the data output from a computer and the modulated laser beam is scanned upon the recording film whereby the data stored in the computer is suitably selected and recorded on the recording film as micro picture images. The laser COM device includes as basic elements a laser light source, a modulator connected to the computer for modulating the laser beam, a scanning mechanism for the laser beam and associated electrical or optical components, a laser optical system, a platen fastened to a base plate at least for the scanning of the laser beam and capable of supporting the recording film to be delivered, and a delivery mechanism for delivering the recording film.

Various laser recording systems for scanning microfilm with a laser beam in two-dimensions are well known such as the system disclosed, for example, in Japanese Laid-Open Patent Application No. 53-13727. Various camera mechanisms which include a platen for supporting microfilm and delivering microfilm segments one after another are also well known as described, for example, in Japanese Laid-Open Patent Application No. 53-3816 and Japanese Laid-Open Patent Application Nos. 53-6640 and 53-6641. Also, Japanese Patent Application No. 52-136451 discloses such a mechanism. In any of these camera mechanisms, after picture images are recorded on the recording film strip, they are utilized according to the usual practice for roll films or fiche films.

In the laser COM device according to the present invention, the arrangement of the platen is so modified that alternative recording between the comic mode and the cine mode on the recording film can readily be achieved. A primary object of the present invention is to provide a laser COM device in which the surface to be scanned by the laser beam of the strip-shaped recording film supported by the platen is scanned by the scanning beam of the laser optical system with the delivery direction and the direction of the main scan of the laser optical system substantially coincident with each other or, alternatively, the delivery direction of the recording film and the direction of the sub-scan of the laser optical system normal to the main scan direction are made substantially coincident with each other.

Figure 1A:
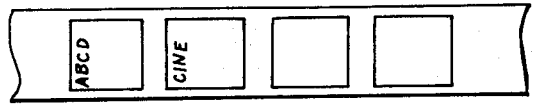
FIGS. 1A and 1B are sketches of a film strip illustrating a cine mode and a comic mode, respectively.
Figure 1B:
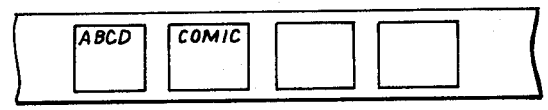
Figure 2:
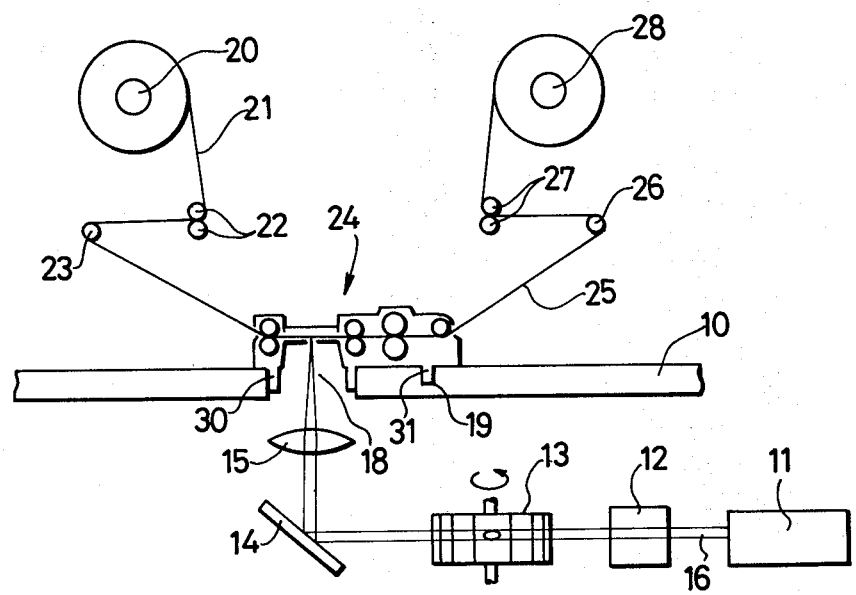
FIG. 2 is a schematic view showing one embodiment of a laser COM device according to the present invention.
Figure 3:
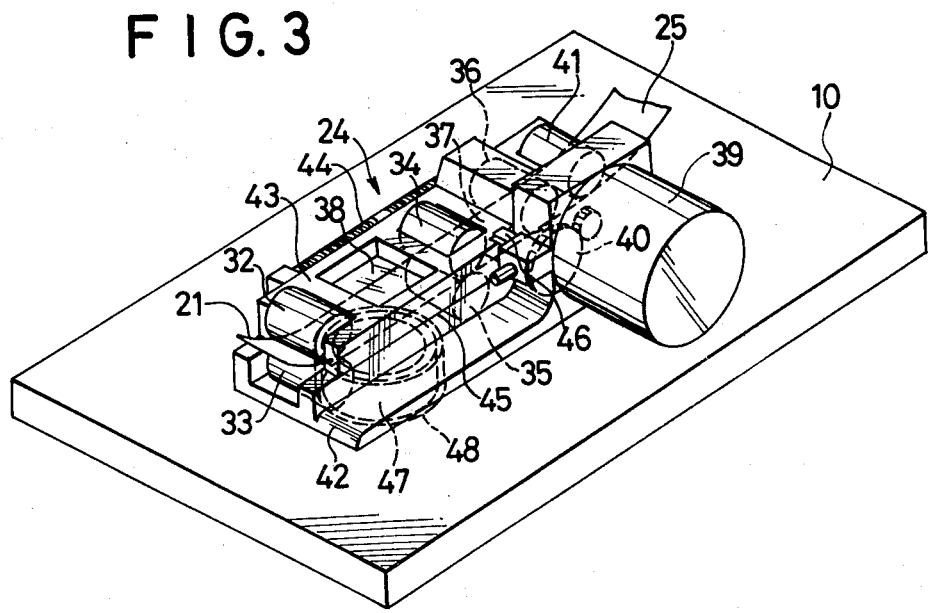
FIGS. 3 to 5 are perspective views of a primary operational portions of the laser COM device according to the present invention showing the platen in two different positions.

The present invention will be hereinafter described with reference to the accompanying drawings. FIG. 2 is a schematic view of a laser COM device according to the present invention while FIG. 3 is a perspective view of the laser COM. In FIG. 2, a laser optical system is provided below the midportion of a base plate 10 while a camera mechanism is disposed on the opposite side thereof. The laser optical system includes a laser light source 11, a light modulator 12, light deflectors 13 and 14, and a lens 15. In this system, a beam of light 16 is modulated by the light modulator 12 and subsequently is deflected in two-dimensions by the light deflectors 13 and 14 and is converged into a small point of light by the lens 15. This beam passes through an aperture 18 formed in the base plate 10 and scans a recording film fastened by a platen on the camera side.

In the camera system, the recording film 21, initially wound on a feeding roller 20, is introduced to the platen 24 through a pair of rollers 22 and a single movable roller 23 and the recorded microfilm 25 is introduced onto a winding roller 28 through a single movable roller 26 and a pair of rollers 27. In the figures, a motor required for performing the winding operation, and other components, the detailed structure of which do not form a part of the invention, are omitted. The platen 24 is provided with projections 30 and 31 which are engaged with the aperture 18 and with a slot 19 formed in the base plate 10, respectively, so that the platen 24 is fastened so as to prevent rotation and vibration. The platen 24 is schematically illustrated in cross-section in the recording region of the recording film in FIG. 2 and a more detailed perspective view is shown in FIG. 3.

Referring now to FIG. 3, the platen 24 and the associated mechanism will be described. The platen 24 shown in FIG. 3 is adapted to clamp the recording film 21 which has a relatively narrow width of, for example, 16 mm between a first pair of rollers 32 and 33 on the trailing side and between a second pair of rollers 34, 35 and 36, 37 on the leading side. The recording film 21 is in close contact with a film supporting plate 38 between the paired rollers. The film supporting plate 38 is made of a transparent material such as a glass plate. Reference numeral 39 designates a motor for delivering the recording film 21 by driving the roller 37 through a gear mechanism 40 to thereby deliver the recording film 21 at a predetermined length while the film is clamped by the paired rollers 36 and 37. The roller 41 is provided for guiding the film on the feed-out side.

The platen 24 may be, for example, made separately of a body 42 and a cap member 43. The platen 24 as shown in FIG. 3 is made of separate members. The rollers 33, 35 and 37, the motor 39 and the gear mechanism 40 are provided on the body 42 side while the rollers 32, 34, 36 and 41 and the film supporting plate 38 are provided on the side of cap member 43. The body 42 and the cap member 43 are connected to each other on one side thereof by a hinge. The body 42 and the cap member 43 are urged towards the open position at a border 45 by a spring 44. A knob 46 secures the body 42 and cap member 43 as a unit against the spring force of the spring 44.

With such a structure, in order to set the recording film 21 in the platen 24, first the knob 46 is pulled to release the cap member 43 from the body member 42. The cap member 43 is closed with the knob after the roll film 21 is set in the platen.

In the laser COM device according to the present invention, a hollow sleeve 47 extending from a lower surface of the body 42 of the platen is inserted into a hole 48 formed in the base plate 10 whereby the platen 24 is detachably secured to the base plate 10. The hollow sleeve 47 and an aperture 48 correspond to the extension 30 and the aperture 18 shown in FIG. 2, respectively. In FIG. 3, since the hollow sleeve 47 is cylindrical, in order to secure the hollow sleeve 47 to the base plate 10, the projection 31 is, as shown in FIG. 2, inserted into the slot 19 formed in the base plate 10. In the embodiment shown in FIG. 3, the aperture 18 shown in FIG. 2 is circular and the projection 30 in FIG. 2 is formed as the hollow cylindrical sleeve 48. Of course other configurations can be used as well. For example, a hollow post having a regular square cross-section may be used instead of the hollow sleeve 47. In this case, since the hollow post can be tightly secured to the base plate 10 so as to prevent rotational movement, the projection 31 and the associated slot 19 formed in the base plate 10 are unnecessary. That is, it is sufficient that the hollow sleeve secured at both points, the position of the two points being such that the lines defined by respective positions and the center of the main aperture formed in the base plate form a right angle. As mentioned above, by turning the platen from a first position to a second position or from the second position to the first position, the platen may be fastened to the base plate 10. Once the platen is dismantled from the base plate, it may easily be moved to the other position. However, it is also easy to change the stationary position of the platen through an angle of 90° using a well-known gear mechanism and associated mechanism elements.

Figure 4:
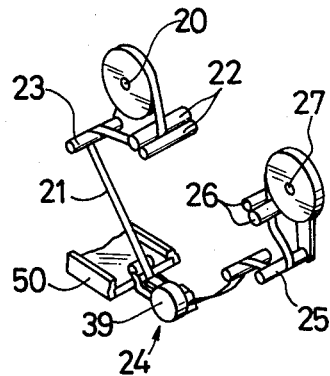
Figure 5:
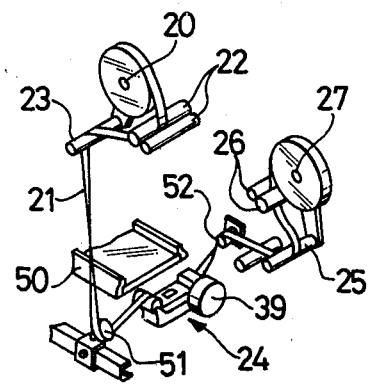

FIGS. 4 and 5 show two different positions of the platen 24 secured to the base plate 10. In FIG. 4, the platen 24 is secured to the base plate 10 so that the direction of delivery of the microfilm on the platen and the direction of the main scan of the laser optical system are made substantially coincident with each other. In contrast, in FIG. 5, the platen 24 is secured to the base plate 10 so that the delivery direction of the microfilm on the platen and the direction of the auxiliary scan of the laser optical system are made substantially coincident with each other. The converse may also be true. That is if FIG. 4 shows a state in which the delivery direction of the microfilm on the platen 24 and the auxiliary scan direction of the laser optical system are coincident with each other, FIG. 5 shows a state in which the delivery direction and the main scan direction are coincident with each other. In any case, it is possible to interchange the two operational states with each other by rotating or replacing the platen.

In FIG. 4, for example, the platen is positioned for comic mode recording. In this case, the film delivery direction and the main scan direction of the optical system are coincident with each other. The film 21 fed from the roll 20 is introduced into the platen 24 through the paired rollers 22 and the single movable roller 23 and secured on the platen 24. As after a recording operation in the comic mode is carried out, the film is fed at a desired speed through the platen and the film exiting the platen is wound onto the roll 27 through the movable roller 25 and the paired rollers 26.

In FIG. 5, the position of the platen is changed for cine mode recording. In this case, the film delivery direction and the auxiliary scan direction of the optical system are coincident. In the same manner as in FIG. 4, the film 20 fed out of the roller 20 passes through the paired rollers 22 and the movable roller 23 and then is directed to the platen 24 by a direction converting the roller 51. The film 21 is secured at the platen 24 after which recording in the cine mode may be carried out. Thereafter, the film 20 is fed at a predetermined rate and the film is directed by the roll 27 through the movable roller 25 and the paired rollers 26 to wind the film onto the roll 27.

Thus, according to the present invention, in a laser COM device using a laser optical system, change-over between the cine and comic modes can be readily carried out with a simple mechanism as described.

What is claimed is:

1. A laser COM device comprising a platen secured to a base plate for supporting a strip-shaped recording film means for delivering said recording film to said platen and a laser optical system capable of recording micro-picture images on the recording film supported by said platen by scanning with modulated laser light in a two-dimensional pattern, said platen being supported so that a scan surface of the recording film is scanned by the laser light, and the platen being rotatable with respect to the base plate so that, alternatively, the delivery direction of the record film is parallel to a main scan direction of the laser optical system or the delivery direction and the auxiliary scan direction of the optical system are parallel to each other.

2. A film handling device comprising means for supplying a strip of recording film, a base plate having an aperture therein, a platen for holding a portion of said strip of recording film upon a first side of said aperture, means for optically scanning portion of said recording film through said aperture disposed on a second side of said aperture, means for securing said platen to said base plate in at least two fixed positions wherein in a first fixed position a main scan direction of said optical scanning means is perpendicular to the direction of delivery of said film at platen and in a second fixed position said main scan direction is parallel to said direction of delivery.

3. The film handling device of claim 2 wherein said aperture is round and said securing means comprises a hollow square shaped ring the outer periphery of which is adapted to be received in said aperture.

4. The film handling device of claim 2 wherein at least one slot is provided in said base plate extending from said first side and wherein said securing means comprises a protrusion extending from said platen adapted to be received in said slot.

5. The film handling device of either claim 2 or 4 wherein said aperture is round and said securing means comprises a cylindrically-shaped ring the outer periphery of which is adapted to be received in said aperture.

* * * * *